United States Patent
MacCagnan et al.

(10) Patent No.: US 11,642,827 B2
(45) Date of Patent: May 9, 2023

(54) EXTRUSION DEVICE

(71) Applicant: GIMAC DI MACCAGNAN GIORGIO, Castronno (IT)

(72) Inventors: Simone MacCagnan, Castronno (IT); Lorenzo Gatti, Castronno (IT)

(73) Assignee: GIMAC DI MACCAGNAN GIORGIO, Castronno (IT)

( * ) Notice: Subject to any disclaimer, the term of this patent is extended or adjusted under 35 U.S.C. 154(b) by 0 days.

(21) Appl. No.: 16/964,918

(22) PCT Filed: Jan. 22, 2019

(86) PCT No.: PCT/IB2019/050526
§ 371 (c)(1),
(2) Date: Jul. 24, 2020

(87) PCT Pub. No.: WO2019/145852
PCT Pub. Date: Aug. 1, 2019

(65) Prior Publication Data
US 2021/0031429 A1  Feb. 4, 2021

(30) Foreign Application Priority Data
Jan. 24, 2018  (IT) .................. 102018000001715

(51) Int. Cl.
*B29C 48/49* (2019.01)
*B29C 48/92* (2019.01)
*B29C 48/025* (2019.01)
*B29C 48/16* (2019.01)
*B29C 48/285* (2019.01)

(52) U.S. Cl.
CPC .......... *B29C 48/49* (2019.02); *B29C 48/0255* (2019.02); *B29C 48/16* (2019.02); *B29C 48/286* (2019.02); *B29C 48/92* (2019.02); *B29C 2948/926* (2019.02); *B29C 2948/9259* (2019.02); *B29C 2948/92095* (2019.02); *B29C 2948/92104* (2019.02); *B29C 2948/92704* (2019.02); *B29C 2948/92857* (2019.02)

(58) Field of Classification Search
CPC ..... B29C 48/286; B29C 48/285; B29B 7/242; B29B 7/7485; B29B 7/748; B29B 7/749
See application file for complete search history.

(56) References Cited

U.S. PATENT DOCUMENTS

2011/0112220 A1* 5/2011 Panciroli ................ B29C 48/29
523/351

* cited by examiner

*Primary Examiner* — Galen H Hauth
(74) *Attorney, Agent, or Firm* — J. Miguel Hernandez; James R. Gourley; Carstens, Allen & Gourley, LLP

(57) ABSTRACT

An extrusion device comprises at least one supply station suitable for containing a material to be extruded; a plurality of propellers operatively connected to at least one supply station for receiving the material to be extruded and at least one extrusion head connected to at least one propeller. Each propeller can also be selectively activated to modulate an extrusion speed and/or a quantity of material to be extruded as an output from the extrusion head.

12 Claims, 1 Drawing Sheet

EXTRUSION DEVICE

CROSS-REFERENCE TO RELATED DISCLOSURE

This application is a U.S. National Stage of International Application No. PCT/IB2019/050526, entitled "Extrusion Device," filed on Jan. 22, 2019, and published as WO 2019/145852 on Aug. 1, 2019, which claims priority to Italian Application No. 102018000001715 filed on Jan. 24, 2018. Each application, publication, and patent listed in this paragraph are hereby incorporated by reference in their entireties.

The present invention relates to the field of systems for the realization of objects by means of extrusion processes: at the same time, the present invention relates to an extrusion device.

The production of extruded products is a rapidly expanding market, especially as regards technical polymers, and the growing demand for products realized according to such technique resulted in a need to increase production volumes.

However, it is necessary to ensure, at the same time, a high control over the extrusion process performances, so as to ensure consistency and high quality of the products realized.

For this reason, it is essential to have systems that are able to operate in a dynamic way, adapting to the specifications of the product to be realized, i.e. that are able to operate with a great variety of different materials in an extremely precise manner, while maintaining at the same time high production volumes.

This problem becomes particularly evident when the extrusion process is directed to the realization of segmented extrudates, i.e. extrusions realized using more than one material within the same product.

The realization of a segmented extrudate allows to obtain products having different chemical/physical characteristics in different portions of the product, simply by modulating the type of material used to make that particular portion.

Therefore, for such products there is the further difficulty in being able to determine the process parameters that allow to carry out a simultaneous processing on several materials, ensuring, at the same time, a high processing speed and the structural integrity of the materials themselves, especially in the segmentation portions, i.e. all those areas of the finished product in which a transition from a first to a second material occurs.

At such segmentation portions, the quantity of the individual materials to be extruded must be calibrated and controlled in a very precise manner.

Such fine calibration is done by modulating the extrusion speed of the single propellers which compose the extrusion device, increasing/decreasing it as a function of an increase/decrease of the percentage of extruded material from a particular propeller which must compose a certain portion of the finished product.

However, such scenario often turns out to be incompatible with the desired production volume standards.

In fact, there are limits to the operating speed of the propellers imposed by the physical characteristics of the materials used, which tend to deteriorate substantially when processed at a too high or too low speed (with respect to the ideal outflow characteristics of the materials themselves).

Such problem could be in principle solved by increasing the size of the device, thus increasing the volume of material that can be simultaneously processed, thus allowing the volume of extruded material to be increased at the same processing speed.

However, such solution is not efficiently applicable to extrusion processes, especially when segmented extrudates are to be realized (in the "axial" sense, i.e. with an alternate subdivision of two or more materials along the extrusion axis, and/or also in a "radial" direction, i.e. with a subdivision by increasing rays of two or more cross-sections in two or more materials in an ideal plane normal to the extrusion axis), as it would imply a reduction in the processing speed of each propeller involved.

The problems arising in this type of processes will be clearer by the following example: at a segmentation portion, where the percentages of a first material tend to 0% and the percentages of a second material tend to 100%, it is necessary to impose decreasing extrusion speeds for the extruder of the first material and increasing extrusion speeds for the extruder of the second material.

In such scenario, it is intended to ensure, at the same time, a production volume that is as high as possible, while maintaining the operating speed of the propellers within the limits of deterioration (both in "mechanical" and/or also "thermal" terms, depending on the different possible outflow conditions), i.e. of the second material, e.g. between 5 and 50 revolutions per minute (rpm).

To satisfy such need it is possible, as indicated above, to increase the size of the device, reducing the processing speed while maintaining high production volumes.

However, such solution also entails a reduction in the speed of the propeller of the first material, which could thus be too low to be controlled. In fact, below a certain operating speed threshold of the propeller, e.g. below 1 rpm, it becomes substantially impossible to efficiently detect and correct any errors or inaccuracies of the extrusion process: it should also be noted that in these particular outflow conditions, a longer residence time of the material inside the extruder implies a greater thermal degradation.

However, such criticality is also detected in the case where a single material is used to realize the finished product.

In fact, also in such situation it is impossible to increase the processing speeds besides a certain threshold imposed by the physical tolerance limits of the material used, however an increase in the extrusion head flow would prevent the extrusion speed to be reduced below a certain threshold, because it would lead to poorly controllable and manageable speeds with the consequent detriment of the quality of the finished product and, more importantly, it would prevent a fine calibration of the quantity of the material to be extruded.

Therefore, it is evident that it is crucial, for the realization of high quality products, an optimal management of the extrusion device, in particular as regards the speeds with which the propellers operate.

The above description is further added to management logistical problems of the space around the extrusion machinery, which do not always allow the installation of several independent extrusion plants which converge in a same point, in a same production line, in such a way to contribute to the realization of the same product.

In this context, the technical task underlying the present invention is to propose an extrusion device which overcomes at least some drawbacks of the above-mentioned prior art.

In particular, it is an object of the present invention to provide an extrusion device able to allow an accurate and precise control of the extrusion speed, maximizing, at the same time, the production volume.

It is also an object of the present invention to provide an extrusion device which allows to significantly increase the production volume, maintaining the extrusion speed within a range in which it can be controlled in a precise manner and which does not cause deterioration of the extruding material.

It is also an object of the present invention to provide a compact extrusion head able to reduce the overall dimensions of such type of device while facilitating the realization of small-sized products.

The mentioned technical task and the specified objects are substantially achieved by an extrusion head, including the technical specifications set out in one or more of the appended claims.

According to the present invention, an extrusion device comprises at least one supply station suitable for containing a material to be extruded is shown; a plurality of propellers operatively connected to at least one supply station for receiving the material to be extruded and at least one extrusion head connected to at least one propeller.

Each propeller can also be selectively activated to modulate an extrusion speed and/or a quantity of material to be extruded as an output from the extrusion head.

In particular, each propeller is configured to operate at an exemplary extrusion speed of between 5 and 50 rpm, generating an amount of total extruded material coming out from the extrusion head proportionally related to the characteristics of the plant and/or the characteristics of the polymeric material processed by the plant itself.

Preferably, the extrusion device comprises a thermo-regulating device (e.g., but not limited to, a thermostatic bath) which is simultaneously active on at least one pair of propellers in such a way to regulate a common extrusion temperature.

Even more preferably, the thermo-regulating device is simultaneously active on each propeller.

Such configuration makes it possible to operate and control the temperature of the extrusion device by means of a single thermo-regulating device, reducing the costs and the complexity of the realization of the device.

Preferably, the device further comprises a plurality of thermo-regulating elements, for example a plurality of resistors, each of which is connected to a respective propeller to regulate an individual extrusion temperature. Such configuration allows to perform a fine regulation of the operating temperature of the individual propellers independently.

Preferably, the device further comprises a housing configured to contain the plurality of propellers.

According to a particular aspect, the extrusion device comprising a supply station suitable for containing a material to be extruded; a plurality of propellers, each operatively connected to the supply station for receiving the material to be extruded and an extrusion head connected to each propeller for receiving the material to be extruded.

According to a further aspect, the extrusion device comprises a plurality of supply stations, each of which is suitable for containing a respective different material to be extruded; a plurality of propellers operatively connected to a respective supply station for receiving a respective material to be extruded and an extrusion head connected to each propeller for receiving the material to be extruded.

Preferably, according to such aspect, the extrusion device further comprises a mixing chamber, interposed between the plurality of propellers and the extrusion head, configured to realize a homogeneous mixing of the materials to be extruded coming out of the respective propellers.

According to a further possible aspect, the extrusion device comprises:
- a first supply station suitable for containing a first material to be extruded;
- a second supply station suitable for containing a second material to be extruded;
- a plurality of propellers which comprises:
- a first propeller operatively connected to the first supply station for receiving the first material to be extruded;
- a second propeller operatively connected to the second supply station for receiving the second material to be extruded;
- a third propeller selectively connected to the first or second supply station for respectively receiving the first or second material to be extruded;
- a plurality of extrusion heads, each of them connected to at least one propeller for receiving the first or second material to be extruded.

Preferably, according to such aspect, the extrusion device comprising a first selection device arranged at the inlet of the third propeller and configured to conduct a switching of such propeller from a first supply configuration wherein it is operatively connected to the first supply station and a second supply configuration wherein it is operatively connected to the second supply station.

Preferably the plurality of extrusion heads comprises a first extrusion head operatively connected to the first and third propeller for receiving the first material to be extruded and a second extrusion head operatively connected to the second and third propeller for receiving the second material to be extruded.

According to such aspect, the extrusion device further comprises a second selection device arranged at the output of the third propeller and configured to conduct a switching of such propeller from a first extrusion configuration wherein the third propeller is operatively connected to the first extrusion head and a second extrusion configuration wherein the third propeller is operatively connected to the second extrusion head.

Further characteristics and advantages of the present invention will become more apparent from the description of an exemplary, but not exclusive, and therefore non-limiting preferred embodiment of an extrusion head, as illustrated in the appended drawings, wherein.

Figure 1:
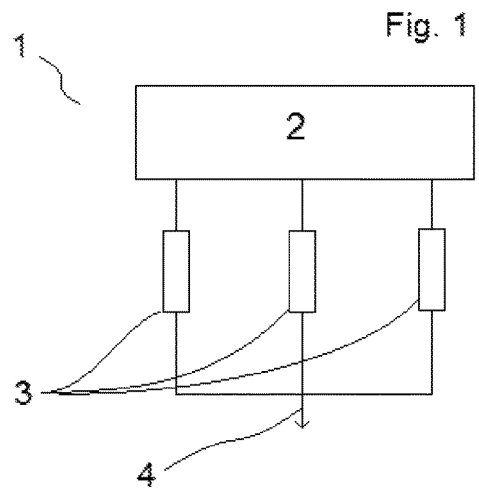
FIG. 1 shows an extrusion device according to a first possible embodiment.

In the attached Figures the reference number 1 generally refers to an extrusion device according to the present invention.

The extrusion device 1 comprises at least one supply station 2, a plurality of propellers 3 and at least one extrusion head 4.

Supply station 2 refers to a tank, a hopper or any high container suitable for storing a material to be extruded and supply it to a subsequent component of the extrusion device, arranged downstream of the supply station 2.

For the purposes of the present description, the generic term "material to be extruded" refers to any material known to be used in the field of extrusion processes, e.g. plastics, polymers or other materials.

Each propeller 3 is operatively connected to at least one supply station 2, in such a way to be able to receive from it the material to be extruded.

The extrusion head is connected to at least one propeller 3 to receive from it the material to be extruded.

In other words, the extrusion device 1 defines an extrusion flow that moves from the supply station 2 to the extrusion head 4, passing through the propeller 3 which is connected at the input to the supply station 2 and at the output to the extrusion head 4.

Furthermore, each propeller 3 can be selectively activated to allow a modulation of an extrusion speed and/or a quantity of material to be extruded as an output from the extrusion head.

In particular, each propeller 3 is configured to operate at an extrusion speed in the range from 5 rpm to 50 rpm generating an amount of extruded material coming out from the extrusion head which is proportionally correlated.

In other words, the selective activation/deactivation of the individual propellers allows to obtain an extremely precise regulation of the operating parameters of the extrusion device 1, in particular with respect to the operating speed of the propellers 3 and the flow rate of the extrusion head 4.

In fact, if it is desirable to increase the flow rate of one or more materials to be extruded, it is possible to modulate the operating speed of the single propellers associated to the supply station containing that material, so as to obtain such increase, simply by activating or increasing the speed of one or more propellers 3, maintaining a sufficiently low speed to avoid damaging of the material to be extruded, since the variation is divided among several propellers 3 and must not be fully supported by a single propeller 3.

Likewise, if it is desired to reduce the flow rate of one or more materials to be extruded, it is possible to modulate the operating speed of the single propellers associated to the supply station containing that material, so as to obtain such reduction, simply by deactivating or reducing the speed of one or more propellers 3, maintaining a sufficiently high speed to be correctly controlled and corrected in case of errors, as also in this case the variation is divided among several propellers 3 and does not have to be fully supported by a single propeller 3.

A more precise definition of the different possible paths of the extrusion flow through the extrusion device 1 and the possible specific connections between its components will be more detailed below, together with a specific presentation of some possible preferred embodiments of the present invention.

In general, the extrusion device 1 comprises a thermo-regulating device which is simultaneously active on at least one pair of extruders in such a way to regulate a common extrusion temperature.

Advantageously, the thermo-regulating device can be simultaneously active on each propeller 3 of the extrusion device 1.

If a single material, or more materials having similar processing parameters, is processed, it is possible that the propellers 3 of the extrusion device 1 can operate efficiently upon reaching a temperature which is the same for all the propellers 3.

Therefore, the thermo-regulating device allows to greatly simplify the embodiment structure of the extrusion device 1, as it allows to set a common reference temperature set for the propellers 3 associated therewith.

In this way, a set of common extrusion temperatures is applied to each propeller 3 without the need to design and install a different thermo-regulating system for each single propeller 3, with consequent savings in terms of components, costs and overall dimensions.

Preferably, such thermo-regulating device is made of a thermostated metal mass (or, in any case, according to a functionally equivalent device) wherein the propellers 3 are immersed or obtained in order to regulate the temperature when the device is in use.

In order to correctly operate even in situations where several different materials are used or where the different chemical/physical characteristics of the materials to be extruded involved in a given production process make the application of a single common extrusion temperature non-efficient, the extrusion device comprises a plurality of thermo-regulating elements, each of which is connected to a respective propeller 3 to regulate a set of individual extrusion temperatures.

However, also in this case, the extrusion device 1 proves to be more efficient than known devices, since it is in any case possible to impose a common extrusion temperature set, e.g., equal to the processing temperature of the material to be extruded having the lowest processing temperature among those of all the materials involved.

Subsequently, the individual thermo-regulating elements will be used to carry out a fine regulation of the temperature of the other extruders 3, adapting them in an extremely fast and precise way to the particular characteristics of the individual materials to be extruded which must be processed by such propellers 3.

Preferably, the thermo-regulating elements are realized by means of resistors, placed in direct contact with respective propellers 3, able to produce heat by Joule effect.

Such solution enables to supply most of the energy necessary for heating the propellers by means of the common thermo-regulating device, making minimal adjustments to the temperature by means of the thermo-regulating elements which require a reduced power to operate and have a reduced embodiment complexity.

Advantageously, the plurality of propellers 3 can be housed inside a same housing, which therefore allows to obtain a particularly compact and simple to handle structure, improving its portability and reducing its overall dimensions.

According to a particular embodiment, shown in detail in FIG. 1, the extrusion device 1 comprises at least one supply station 2 suitable for containing a material to be extruded.

Always according such embodiment, the extrusion device 1 comprises a plurality of propellers 2, each of which is operatively connected to the supply station, to receive from it the material to be extruded and an extrusion head 4 connected to each propeller 3.

Such embodiment allows to obtain high flow rates of extruded material, significantly speeding up the production process, while maintaining the possibility of carrying out a fine regulation on the extrusion speed segmenting the supply of the extrusion head 4 acting simultaneously on more propellers 3 instead of on a single propeller 3.

Therefore, such configuration enables to obtain substantially faster and more precise speed variations.

In fact, if it is desired to obtain an increase/reduction of the extruded material flow rate, the consequent increase/reduction of the operating speed of the propeller 3 must not be absorbed by a single propeller 3, which may also require long times to obtain a substantial speed variation, but it is divided among a plurality of propellers 3, reducing the switching times the more markedly, the greater the number of propellers 3 among which such variation is divided.

Figure 2:
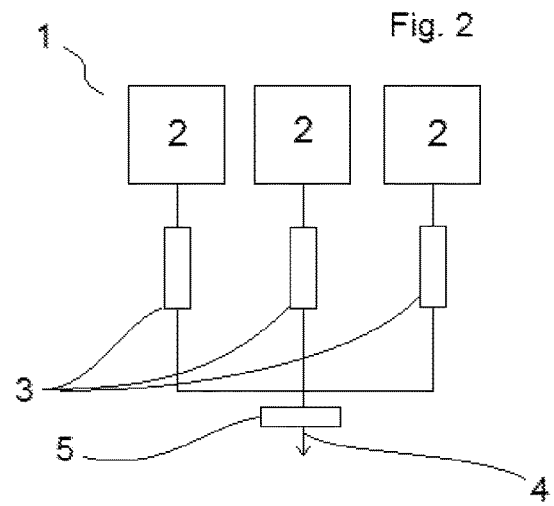
FIG. 2 shows a schematic extrusion device of an extrusion head according to a second possible embodiment.

According to a further possible embodiment, shown in greater detail in the attached FIG. 2, the extrusion device comprises a plurality of supply stations 2, each of which is suitable for containing a respective different material to be extruded and a plurality of propellers 3, each of which is operatively connected to a respective supply station for receiving from it a respective material to be extruded.

In other words, there are as many supply stations 2 as the amount of materials necessary for the realization of the object to be produced and each propeller 3 is connected to a different supply station for receiving from it, and then processing, a different material.

Always according to such embodiment, the extrusion device 1 further comprises an extrusion head 4, arranged downstream of the propellers 3, connected to each of them for receiving the material to be extruded.

Preferably, the extrusion device 1 comprises a mixing chamber 5, interposed between the plurality of propellers 3 and the extrusion head 4, configured to realize a homogeneous mixing of the materials to be extruded coming out of the respective propellers 3.

In other words, according to such embodiment, it is possible to obtain a fine adjustment of extrusion speed and/or quantity of material to be extruded coming out of the extrusion head even in products which can be realized by mixing different materials.

Figure 3A:
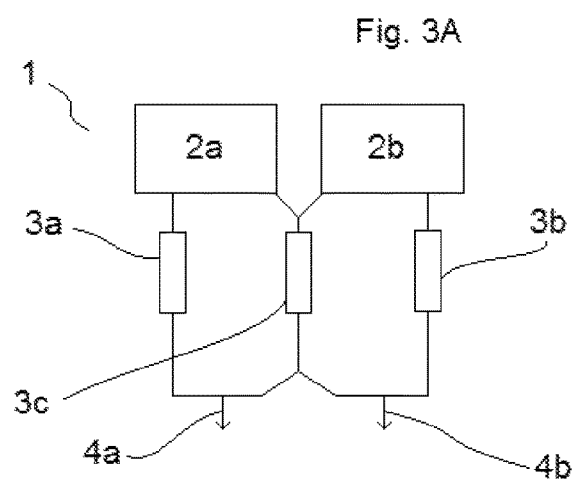
FIG. 3 shows a schematic extrusion device of an extrusion head according to a third possible embodiment.
Figure 3B:
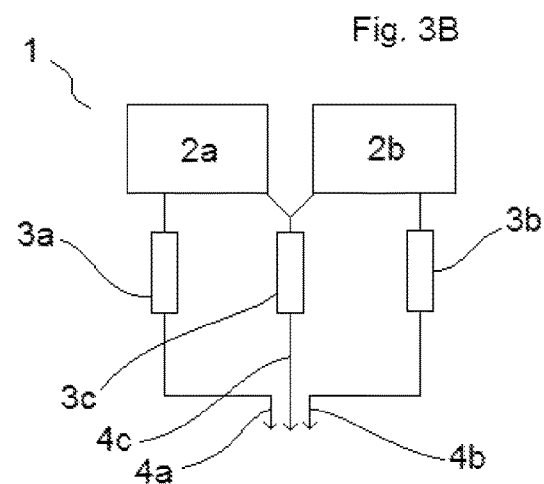

According to a further possible embodiment, shown in greater detail in the attached FIGS. 3A, 3B, the extrusion device 1 comprises two supply stations 2, specifically a first supply station 2a suitable for containing a first material to be extruded and a second supply station 2b suitable for containing a second material to be extruded.

The extrusion device 1 further comprises a plurality of propellers 3, in particular a first propeller 3a operatively connected to the first supply station 2a for receiving the first material to be extruded; a second propeller 3b operatively connected to the second supply station 2b for receiving the second material to be extruded and a third propeller 3c selectively connectable to the first or second supply station 2a, 2b for receiving the first or second material to be extracted, respectively.

In other words, the extrusion device 1 comprises a first and a second propeller 3a, 3b directly connected and which can be supplied via respectively the first and second supply stations 2a, 2b, plus a third propeller 3c which can be selectively supplied by the first or the second supply station 2a, 2b, allowing in this way to process the first or second material to be extruded inside the third propeller 3c.

Always according to such embodiment, the extrusion device 1 comprises a plurality of extrusion heads 4, each of them is connected to at least a propeller 3a, 3b, 3c for receiving the first or second material to be extruded.

In order to allow a correct management of the extrusion flow, the extrusion device 1 comprises a first selection device 6 placed at the inlet of the third propeller 3c and configured to conduct a switching of such third propeller 3c from a first supply configuration wherein it is operatively connected to the first supply station 2a for receiving the first material to be extruded and a second supply configuration wherein it is operatively connected to the second supply station 2b for receiving the second material to be extruded.

Particularly, as shown in FIG. 3B, the extrusion device 1 comprises a plurality of extrusion heads 4, each of them is connected to a respective propeller 3a, 3b, 3c for receiving the first or second material to be extruded.

In other words, the extrusion device 1 comprises a first extrusion head 4a connected to the first propeller 3a, a second extrusion head 4b connected to the second propeller 3b and a third extrusion head 4c connected to the third propeller 3c.

Alternatively, as shown in FIG. 3A, the plurality of extrusion heads 4 comprises a first extrusion head 4a operatively connected to the first and third propeller 3a, 3c for receiving the first material to be extruded and a second extrusion head 4b operatively connected to the second and third propeller 3b, 3c for receiving the second material to be extruded.

In other words, the first extrusion head 4a is configured for receiving the first material to be extruded always from the first propeller 3a and from the third propeller 3c only when the latter is processing the first material to be extruded (and is therefore connected to the first supply station 2a), while the second extrusion head 4b is configured for receiving the second material to be extruded always from the second propeller 3b and from the third propeller 3c only when the latter is processing the second material to be extruded (and is therefore connected to the second supply station 2b).

According to such possible embodiment, the extrusion device 1 comprises a second selection device 7 placed at the outlet of the third propeller 3c and configured to conduct a switching of such third propeller 3c from a first extrusion configuration wherein it is operatively connected to the first extrusion head 4a for transferring the first material to be extruded to it and a second extrusion configuration wherein it is operatively connected to the second extrusion head 4b for transmitting the second material to be extruded to it.

In other words, by means of the first selection device 6 it is possible to selectively open/close respective connection portions between the third propeller 3c and the first or second supply station 2a, 2b in such a way to selectively supply, preferably in alternatively, the first or second material to be extruded.

In light of the foregoing, the present invention achieves the proposed objects, overcoming the drawbacks mentioned in the prior art by providing an extrusion device which allows to optimize the extrusion process while ensuring high production volumes and high quality of the realized product.

In particular, the structure of the present invention allows to obtain a precise regulation of the extrusion speed of the extrusion device, while ensuring high production volumes as well as a better and wider possibility to define efflux speed (e.g., particularly low) in coordination and/or simultaneously with an equally wide range of flow rates (e.g., particularly high).

It should also be noted that thanks to the "multi-propeller" architecture described so far and claimed below, it is possible to obtain an extruder with a very favourable width/length ratio (and in particular, a very short extruder with respect to the total expressible flow rate) thanks to the fact that the invention allows to cooperatively define—by dividing it—the total flow rate over several propulsion chambers: this allows an easier system integration into different types of machinery such as anthropomorphic and non-anthropomorphic robotic arms or 3D printing heads.

The invention claimed is:
1. Extrusion device comprising:
   at least one supply station suitable for containing a material to be extruded;
   a plurality of propellers, each propeller of said plurality of propellers being operatively connected to at least one corresponding supply station for receiving the material to be extruded from said at least one corresponding supply station, said at least one corresponding supply station selected from the at least one supply station;
   at least one extrusion head, arranged downstream of said plurality of propellers, connected to at least one pro- peller for receiving the material to be extruded from said at least one propeller, said at least one propeller selected from said plurality of propellers;

wherein each propeller of said plurality of propellers can be selectively activated to modulate an extrusion speed and/or a quantity of material to be extruded as an output from a corresponding head or corresponding heads the at least one extrusion head;

wherein the at least one supply station comprises:
a first supply station suitable for containing a first material to be extruded; and
a second supply station suitable for containing a second material to be extruded;

wherein the plurality of propellers comprises:
a first propeller operatively connected to the first supply station for receiving the first material to be extruded from said first supply station;
a second propeller operatively connected to the second supply station for receiving the second material to be extruded from said second supply station;
a third propeller selectively connected to the first or second supply station for receiving the first or second material to be extruded from said first or second supply station, respectively; and the extrusion device comprises:
a plurality of extrusion heads, arranged downstream of said plurality of propellers, each extrusion head of the plurality of extrusion heads being connected to at least one propeller for receiving from said propeller the first or second material to be extruded, said at least one extrusion head selected from said plurality of extrusion heads;

wherein said plurality of extrusion heads comprises:
a first extrusion head operatively connected to the first and to the third propeller for receiving the first material to be extruded from said first and third propeller; and
a second extrusion head operatively connected to the second and to the third propeller for receiving the second material to be extruded from said second and third propeller characterised in that said extrusion device comprises a thermo-regulating device simultaneously active on at least one pair of propellers so as to regulate a common extrusion temperature of said at least one pair of propellers, said at least one pair of propellers selected from said plurality of propellers.

2. The extrusion device according to claim 1, wherein the thermo-regulating device is simultaneously active on each propeller of said at least one pair of propellers.

3. The extrusion device according to claim 1, comprising a plurality of thermo-regulating elements each thermo-regulating element being connected to a respective propeller of said plurality of propellers to regulate an individual extrusion temperature of said respective propeller.

4. The extrusion device according to claim 1, wherein each propeller of said plurality of propellers is configured to operate at an extrusion speed in the range from 5 rpm to 50 rpm generating an amount of total extruded material coming out from a respective extrusion head which is proportionally correlated.

5. The extrusion device according to claim 1, comprising a housing configured to contain the plurality of propellers.

6. The extrusion device according to claim 1, wherein:
each propeller of the plurality of propellers being operatively connected to the supply station for receiving material to be extruded from said supply station.

7. The extrusion device according to claim 1, wherein:
each supply station being adapted to contain a respective different material to be extruded; and
each propeller of the plurality of propellers being operatively connected to a respective supply station for receiving a respective material to be extruded from said respective supply station, the respective supply station selected from the plurality of supply stations.

8. The extrusion device according to claim 7, comprising a mixing chamber, interposed between the plurality of propellers and the at least one extrusion head, configured to realize a homogeneous mixing of the materials to be extruded coming out of the respective propellers.

9. The extrusion device according to claim 1, comprising a first selection device placed at the inlet of the third propeller and configured to conduct a switching of said third propeller from a first supply configuration wherein the third propeller is operatively connected to the first supply station for receiving the first material to be extruded from said first supply station and a second supply configuration wherein the third propeller is operatively connected to the second supply station for receiving the second material to be extruded from said second supply station.

10. The extrusion device according to claim 1, comprising a second selection device placed at the output of the third propeller and configured to conduct a switching of said third propeller from a first extrusion configuration wherein the third propeller is operatively connected to the first extrusion head for transferring to said first extrusion head the first material to be extruded and a second extrusion configuration wherein the third propeller is operatively connected to the second extrusion head for transferring the second material to be extruded to said second extrusion head.

11. The extrusion device according to claim 1, wherein the thermo-regulating device comprises a thermostatic bath.

12. The extrusion device according to claim 3, wherein the plurality of thermo-regulating elements comprise a plurality of resistors.

* * * * *